(12) United States Patent
Mahle et al.

(10) Patent No.: US 9,617,863 B2
(45) Date of Patent: Apr. 11, 2017

(54) GAS TURBINE STAGE

(71) Applicant: MTU Aero Engines AG, Munich (DE)

(72) Inventors: Inga Mahle, Munich (DE); Norbert Huebner, Munich (DE); Rudolf Stanka, Munich (DE); Gottfried Schuetz, Munich (DE); Norman Cleesattel, Munich (DE)

(73) Assignee: MTU Aero Engines AG, Munich (DE)

( * ) Notice: Subject to any disclaimer, the term of this patent is extended or adjusted under 35 U.S.C. 154(b) by 377 days.

(21) Appl. No.: 14/325,785

(22) Filed: Jul. 8, 2014

(65) Prior Publication Data
US 2015/0016985 A1   Jan. 15, 2015

(30) Foreign Application Priority Data

Jul. 12, 2013  (EP) .................................... 13176420

(51) Int. Cl.
*F01D 9/04* (2006.01)
*F01D 5/14* (2006.01)
*F01D 21/04* (2006.01)

(52) U.S. Cl.
CPC ............ *F01D 9/041* (2013.01); *F01D 5/141* (2013.01); *F01D 21/045* (2013.01); *F05D 2240/121* (2013.01); *Y02T 50/673* (2013.01)

(58) Field of Classification Search
CPC ........ F01D 21/02; F01D 21/04; F01D 21/045; F01D 9/041; F01D 11/08; F01D 5/141; F05D 2240/121; Y02T 50/673
USPC ...................................................... 60/39.091
See application file for complete search history.

(56) References Cited

U.S. PATENT DOCUMENTS

| | | | | |
|---|---|---|---|---|
| 3,314,651 A | * | 4/1967 | Beale ................... | A61K 8/4913 |
| | | | | 415/173.6 |
| 4,238,170 A | * | 12/1980 | Robideau ................ | F01D 11/08 |
| | | | | 415/173.5 |
| 4,645,417 A | * | 2/1987 | Wisler .................... | F01D 11/08 |
| | | | | 415/173.1 |
| 5,645,399 A | * | 7/1997 | Angus ..................... | F01D 11/18 |
| | | | | 415/177 |
| 6,120,242 A | * | 9/2000 | Bonnoitt ............... | F01D 11/127 |
| | | | | 415/174.4 |

(Continued)

FOREIGN PATENT DOCUMENTS

| | | |
|---|---|---|
| EP | 0 661 413 | 7/1995 |
| EP | 1 640 564 | 3/2006 |
| EP | 2 204 534 | 7/2010 |

*Primary Examiner* — Dwayne J White
*Assistant Examiner* — Sang K Kim
(74) *Attorney, Agent, or Firm* — Davidson, Davidson & Kappel, LLC

(57) ABSTRACT

A gas turbine stage including a rotor blade array having a plurality of rotor blades and an adjacent stator vane array having a plurality of stator vanes which have leading edges facing the rotor blade array. In a first radial position of a rear face of the rotor blade array, a minimum axial gap is formed between this rear face and an opposite first contact region a stator vane leading edges, and in a second radial position of the rear face different from the first position, the minimum axial gap is formed between the rear face and an opposite second contact region. Between the first and second contact regions, this stator vane leading edge has an axial offset of no more than 0.6% of a radial height of the stator vane leading edge.

13 Claims, 2 Drawing Sheets

(56) References Cited

U.S. PATENT DOCUMENTS

| | | | |
|---|---|---|---|
| 6,312,219 B1 | 11/2001 | Wood et al. | |
| 7,484,924 B2 * | 2/2009 | Soupizon | F01D 21/02 |
| | | | 415/9 |
| 8,043,052 B2 * | 10/2011 | Konter | F01D 5/142 |
| | | | 415/191 |
| 8,562,289 B2 * | 10/2013 | Kobayashi | F04D 29/522 |
| | | | 415/173.1 |
| 2006/0251506 A1 | 11/2006 | Soupizon et al. | |
| 2012/0020806 A1 * | 1/2012 | Girard | F01D 5/141 |
| | | | 416/241 R |
| 2013/0173213 A1 * | 7/2013 | Willett, Jr. | F01D 11/14 |
| | | | 702/155 |

* cited by examiner

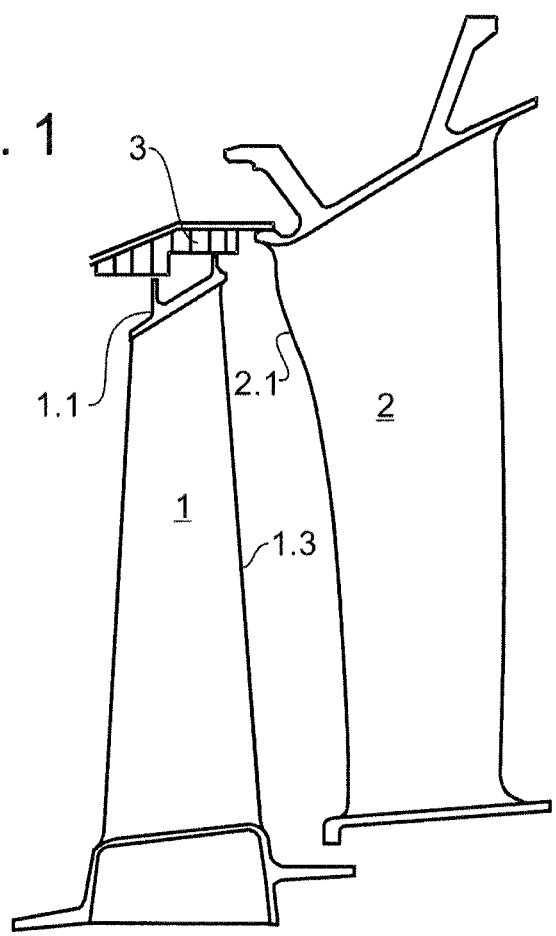

GAS TURBINE STAGE

This claims the benefit of German Patent Application DE 13 176 420.1, filed Jul. 12, 2013 and hereby incorporated by reference herein.

The present invention relates to a gas turbine stage including a rotor blade array having a plurality of rotor blades and an adjacent stator vane array having a plurality of stator vanes, and to a gas turbine, in particular an aircraft engine, having such a gas turbine stage.

BACKGROUND

In a gas turbine, such as is known, for example, from U.S. Pat. No. 6,312,219 B1, one or more gas turbine stages drive one or more compressor stages and/or fans via one or more shafts. In one or more of the gas turbine stages, a stator vane array is provided downstream of a rotor blade array to vary the velocity of the gas flow.

If, in the event of a shaft breakage, the compressor load is abruptly removed, the gas turbine stage(s) may overspeed, which is not desired. Such overspeeding can be reduced or prevented in that the fast rotating rotor blade array of a gas turbine stage is axially displaced toward an adjacent stator vane array, rotates into contact therewith, and is braked by it.

To this end, the rotor blade array must overcome a minimum axial gap between the rotor blade array and the stator vane array. This gap is intended to prevent, to the extent possible, rubbing contact during normal operation, which may occur due to axial tolerances resulting from thermal effects, manufacture, assembly and/or dynamic effects.

In U.S. Pat. No. 6,312,219 B1, this minimum axial gap is formed in a radially inner region between a blade root of the rotor blade array and a shroud of the stator vane array.

SUMMARY OF THE INVENTION

It is an object of an embodiment of the present invention to provide an improved gas turbine.

The present invention provides that a gas turbine stage may, in an embodiment, be a forwardmost or upstreammost turbine stage, a rearwardmost or downstreammost turbine stage, or an intermediate turbine stage between a forwardmost and a rearwardmost stage of a turbine, in particular of a high-, intermediate- or low-pressure turbine, of a gas turbine, in particular of an aircraft engine gas turbine. In an embodiment, one or more, in particular all, of the turbine stages of the gas turbine may be configured as described below.

The gas turbine stage includes a rotor blade array having a plurality of circumferentially distributed rotor blades which may be detachably or permanently connected to a rotor or rotor disk, in particular by a material-to-material bond, and may in particular be formed integrally therewith.

The gas turbine stage includes, adjacent to and downstream of the rotor blade array, a stator vane array having a plurality of circumferentially distributed stator vanes which have leading edges facing the rotor blade array.

In accordance with one aspect of the present invention, a minimum axial gap between the rotor blade array and the stator vane array is formed between a downstream rear face of the rotor blade array and a contact region of one or more stator vane leading edges.

Thus, in an embodiment of the present invention, a breakage of a gas turbine shaft initially results in rubbing contact of the rear face against the stator vane leading edge or edges, followed by braking of the rotor blade array, so that undesired overspeeding can be reduced or prevented.

Rubbing contact or braking against stator vanes may be advantageous, in particular because of their contact geometry, stiffness, strength and/or deformability. For example, energy can be absorbed by suitable elastic and/or plastic deformation and/or fragmentation of stator vanes.

The radial position of the rear face of the rotor blade array relative to the stator vane leading edge, and thus also the contact region of the stator vane leading edge, may vary, in particular due to thermal effects, manufacture, assembly and/or dynamic effects. For example, a rise in temperature can change the radial position of an outer shroud of the rotor blade array.

In order to nevertheless prevent, to the extent possible, rubbing contact during normal operation, these different radial positions and different possible contact regions need to be taken into account.

If the stator vane leading edge is inclined, in particular for aerodynamic reasons, then the minimum axial distance must be observed or specified for the axially forwardmost of these possible contact regions so as to prevent rubbing contact during normal operation also in this radial position of the rear face. However, this disadvantageously increases the overall length of the gas turbine stage.

Therefore, in accordance with one aspect of the present invention, the radial region of the stator vane leading edge within which the rear face of the rotor blade array that is axially displaced as a result of a shaft breakage may vary, and thus the multitude of possible contact regions of the stator vane leading edge, is configured to extend substantially parallel to a radial plane perpendicular to an axis of rotation of the gas turbine stage. Thus, when the radial position of the rear face of the rotor blade array varies relative to the stator vane leading edge, the minimum axial gap varies only slightly, and the stator vane array can advantageously be positioned axially closer to the rotor blade array.

In accordance with one aspect of the present invention, in a first radial position of a rear face of the rotor blade array, a minimum axial gap between the rotor blade array and the stator vane array is formed between this rear face and an opposite first contact region of a stator vane leading edge, and in a second radial position of the rear face different from the first position, the minimum axial gap is formed between the rear face and an opposite second contact region of this stator vane leading edge. In the region between the first and second contact regions, this stator vane leading edge has a continuous axial offset of no more than 0.6%, in particular no more than 0.3%, of a radial height of the stator vane leading edge. In the context of the present invention, the radial height can in particular be the radial extent between a radially inner and a radially outer stator vane boundary or end of the stator vane leading edge. In one embodiment, the radial height is the radial distance between a stator vane foot on the casing side or a radially outer duct wall, in particular the inner casing wall, at the axial level of the stator vane leading edges, on the one hand, and an inner shroud on the rotor side, a radially inner free end of a stator vane or a radially inner duct wall, in particular an outer hub wall, at the axial level of the stator vane leading edges, on the other hand.

Surprisingly, the stator vane array, in particular the aerodynamic, aeroacoustic and aeroelastic properties thereof, are only insignificantly affected by this configuration, and because of the above-described relationship, the minimum distance can be maintained at different radial positions, even in the case of a reduced overall axial length.

The first and/or second radial positions may in particular be maximum positions which result from thermal effects, manufacture, assembly and/or dynamic effects and which, in one embodiment, define the maximum possible radial excursion or variation of the rear face.

In one embodiment, the first contact region is a radially outer, preferably radially outermost or radially outermost possible contact region, in particular a radially outer end of the stator vane leading edge, and the second contact region is located radially further inwardly relative thereto.

In this case, in one embodiment, the rear face can be a rear face of an outer shroud of the rotor blade array.

In one embodiment, due to the radially outer contact regions, a greater braking torque can be exerted while the rubbing contact forces remain the same.

In another embodiment, the first contact region is a radially inner, preferably radially innermost or radially innermost possible contact region, in particular a radially inner end of the stator vane leading edge, and the second contact region is located radially further outwardly relative thereto.

In this case, in one embodiment, the rear face can be a rear face of an inner shroud or platform of the rotor blade array.

In one embodiment, due to the radially inner contact regions, braking can advantageously occur closer to the rotor.

In one embodiment, the second contact region is radially spaced from the first contact region by at least 2% and/or no more than 20% of the radial height of the stator vane leading edge. Additionally or alternatively, the second contact region may be radially spaced from a radially inner or radially outer end of the stator vane leading edge by at least 2% and/or no more than 20% of the radial height of the stator vane leading edge. If the second contact region is located further inwardly, in particular is a radially innermost contact region, then, in one embodiment, it may be located between 80% and 98% of the radial height of the stator vane leading edge, as measured in a radial direction from the inside to the outside. In a preferred refinement, the second, radially innermost contact region is at least substantially located at 85% of the radial height of the stator vane leading edge. In a refinement, the first contact region may be located between 98% and 100% of the radial height of the stator vane leading edge, as measured in a radial direction from the inside to the outside.

In particular for reasons of aerodynamics, aeroacoustics and/or aeroelasticity, the stator vane leading edge may have a forward inclination of at least 8°, in particular at least 10°, in a radial region on the side of the second contact region opposite the first contact region, in particular in a radial region between 30% and 50% of the radial height of the stator vane leading edge. As used herein, a forward inclination is understood to mean, in particular, that a radially further outward point of the stator vane leading edge of the stator vane array is closer to the rotor blade array than a radially further inward point; i.e., that the stator vane leading edge converges toward the rotor blade array, as viewed in a radial direction from the inside to the outside. The inclination or angle may in particular be defined relative to a radial plane perpendicular to an axis of rotation of the gas turbine stage.

In a refinement, the stator vane leading edge has a transition region which extends from the second contact region to the radial region and in which an inclination of the stator vane leading edge increases, in particular strictly monotonically, toward the radial region. As used herein, a strictly monotonically increasing inclination is understood to mean, in particular, that an angle of a tangent at a point on the stator vane leading edge that is closer to the second contact region is always smaller than the angle of a tangent at any point on the stator vane leading edge that is farther away from the second contact region. If the second contact region is a radially inner, in particular an innermost contact region, then, in one embodiment, the inclination of the stator vane leading edge may increase strictly monotonically from the second contact region radially inwardly. The, in particular strictly monotonic, increase creates an advantageous transition into the forwardly inclined radial region.

In one embodiment, the stator vane leading edge is reinforced between the first and second contact regions, in particular by a surface treatment, an increased thickness of the material, or the like. Thus, the rubbing contact occurring in the event of a shaft breakage can be influenced in an advantageous manner.

BRIEF DESCRIPTION OF THE DRAWINGS

Further advantageous features of the present invention will be apparent from the dependent claims and the following description of preferred embodiments. To this end, the drawings show, partly in schematic form, in:

FIG. 1: a portion of a gas turbine stage of low-pressure turbine of an aircraft engine according to an embodiment of the present invention;

DETAILED DESCRIPTION

FIG. 1 shows a portion of a gas turbine stage of low-pressure turbine of an aircraft engine according to an embodiment of the present invention. The gas turbine stage is an intermediate turbine stage, but may also be a forwardmost or rearwardmost turbine stage.

The gas turbine stage includes a rotor blade array having a plurality of circumferentially distributed rotor blades which are detachably or permanently connected to a rotor. At their radially outer ends, the rotor blades have an outer shroud 1.1 having two sealing fins facing an outer honeycomb seal 3.

The gas turbine stage includes, adjacent to and downstream of the rotor blade array (to the right in FIG. 1), a stator vane array having a plurality of circumferentially distributed stator vanes 2 which have leading edges 2.1 facing the rotor blade array.

Figure 2A:
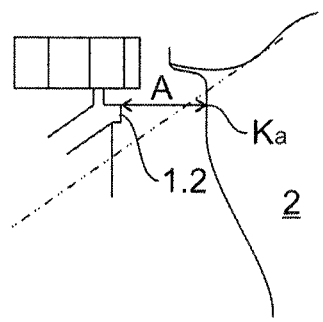
FIG. 2A: an enlarged detail from FIG. 1, with a rear face of a rotor blade array of the gas turbine stage in a first radial position.
Figure 2B:
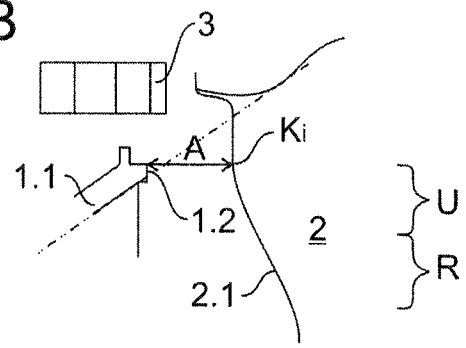
FIG. 2B: the enlarged detail of FIG. 1, with the rear face in a second radial position.

FIG. 2A shows an enlarged detail of FIG. 1, in which a downstream rear face 1.2 of the outer shroud 1.1 of the rotor blade array of the gas turbine stage is in a first, radially outermost position. FIG. 2B shows the enlarged detail of FIG. 1 with the rear face in a second, radially innermost position. A nominal outer duct wall defined by outer shroud 1.1 or a stator vane foot on the casing side is indicated by a dash-dotted line.

In the first, radially outermost position (see FIG. 2A), a minimum axial gap A between the rotor blade array and the stator vane array is formed between rear face 1.2 and an opposite first, radially outermost contact region $K_a$ of stator vane leading edge 2.1. In the second, radially innermost position of rear face 1.2 (see FIG. 2B), the minimum axial gap A is formed between the rear face and an opposite second, radially innermost contact region $K_i$ of this stator vane leading edge.

Between the first and second contact regions, stator vane leading edge 2.1 extends substantially parallel to a radial plane (vertical in FIG. 2) which is perpendicular to the axis of rotation of the gas turbine stage (horizontal in FIG. 2), and thus has an axial offset of 0% of the radial height of the stator vane leading edge.

Thus, in the event of a breakage of a gas turbine shaft, rear face 1.2 initially rubs against stator vane leading edge 2.1 between the two contact regions $K_a$, $K_i$, as a result of which the rotor blade array is braked, so that undesired overspeeding can be reduced or prevented.

When considering FIGS. 2A and 2B together, it is apparent that the radial position of rear face 1.2 relative to stator vane leading edge 2.1 may vary. On the other hand, it is desired for the stator vane leading edge to be inclined, in particular for aerodynamic reasons. However, this may disadvantageously increase the overall length of the gas turbine stage, as will be described below with reference to FIGS. 3A, 3B.

Figure 3A:
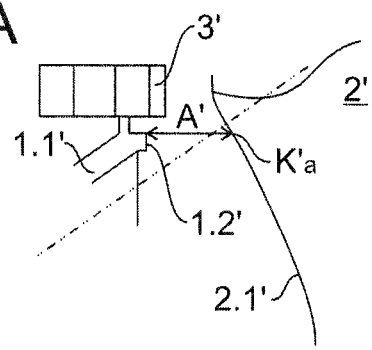
FIG. 3A: a detail of a gas turbine stage according to in-house practice in a view corresponding to FIG. 2A.
Figure 3B:
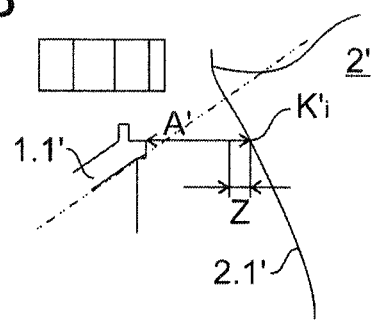
FIG. 3B: the detail of FIG. 3A, with the rear face in a second radial position.

FIG. 3A, 3B are views corresponding to FIGS. 2A, 2B showing a detail of a gas turbine stage according to in-house practice. Corresponding elements are identified by the same reference numerals and distinguished by primes ('), so that reference is made to the above description and only the differences will be discussed below.

In the embodiment of FIG. 3, stator vane leading edge 2.1' is relatively strongly inclined toward the rotor blade array also between the possible regions of contact with the radially varying rear face 1.2'. In the radially outermost position (see FIG. 3A), the minimum axial gap A'=A between the rotor blade array and the stator vane array is formed between rear face 1.2' and an opposite first, radially outermost contact region $K'_a$ of stator vane leading edge 2.1'.

In the radially innermost position of rear face 1.2' (see FIG. 3B), the minimum axial gap A' between the rotor blade array and the stator vane array is formed between rear face 1.2' and an opposite second, radially innermost contact region $K'_i$ of stator vane leading edge 2.1'. Due to the forward inclination of stator vane leading edge 2.1' in this region, this contact region is offset by an axial offset Z away from the rotor blade array and, which results in an increase in the minimum axial gap A'>A and, thus, in the overall length of the gas turbine stage by this offset Z.

The first and second radial positions (see FIGS. 2A, 2B) are maximum positions which result from thermal effects, manufacture, assembly and/or dynamic effects and define the maximum possible radial excursion or variation of rear face 1.2.

Second contact region $K_i$ is radially spaced from first contact region $K_a$ and the radially outer end of the stator vane leading edge or the stator vane foot on the casing side by between 2% and 20% of the radial height of stator vane leading edge 2.1. Thus, conversely, it is located between 80% and 98% of the radial height of the stator vane leading edge, as measured in a radial direction from the inside to the outside.

Stator vane leading edge 2.1 has a forward inclination of at least 10° in a radial region R on the side of the second contact region opposite the first contact region (at the bottom in FIG. 2). A transition region U extends from second contact region $K_i$ to this radial region R. In this transition region, an inclination of the stator vane leading edge increases strictly monotonically toward the radial region.

Stator vane leading edge 2.1 is reinforced between the first and second contact regions (not shown).

Although the above is a description of exemplary embodiments, it should be noted that many modifications are possible. It should also be appreciated that the exemplary embodiments are only examples, and are not intended to limit scope, applicability, or configuration in any way. Rather, the foregoing description provides those skilled in the art with a convenient road map for implementing at least one exemplary embodiment, it being understood that various changes may be made in the function and arrangement of elements described without departing from the scope of protection set forth in the appended claims and their equivalent combinations of features.

LIST OF REFERENCE NUMERALS

1 rotor blade
1.1(') outer shroud
1.2(') rear face
1.3 trailing edge
2(') stator vane
2.1(') stator vane leading edge
3(') outer honeycomb seal
A(') minimum axial gap
$K_a$(') first, radially outermost contact region
$K_i$(') second, radially innermost contact region
R radial region
U transition region
Z offset

What is claimed is:

1. A gas turbine stage comprising:
a rotor blade array having a plurality of rotor blades; and
an adjacent stator vane array having a plurality of stator vanes having leading edges facing the rotor blade array,
wherein in a first radial position of a rear face of the rotor blade array, a minimum axial gap between the rotor blade array and the stator vane array is formed between said rear face and an opposite first contact region of at least one of the stator vane leading edges, and
in a second radial position of the rear face different from the first position, the minimum axial gap is formed between the rear face and an opposite second contact region of the stator vane leading edge, and wherein between the first and second contact regions, the stator vane leading edge has an axial offset of no more than 0.6% of a radial height of the stator vane leading edge.

2. The gas turbine stage as recited in claim 1 wherein the first contact region is a radially outer contact region or a radially inner contact region.

3. The gas turbine stage as recited in claim 1 wherein the second contact region is radially spaced from the first contact region or an end of the stator vane leading edge by at least 2% or no more than 20% of the radial height of the stator vane leading edge.

4. The gas turbine stage as recited in claim 1 wherein the stator vane leading edge has a forward inclination of at least 8° in a radial region on a side of the second contact region opposite the first contact region.

5. The gas turbine stage as recited in claim 1 wherein the stator vane leading edge has a forward inclination of at least 10° in a radial region on a side of the second contact region opposite the first contact region.

6. The gas turbine stage as recited in claim 4 wherein the radial region is between 30% and 50% of the radial height of the stator vane leading edge.

7. The gas turbine stage as recited in claim 1 wherein in a transition region extending from the second contact region to a radial region an inclination of the stator vane leading edge increases.

8. The gas turbine as recited in claim 7 wherein the transition region increases strictly monotonically.

9. The gas turbine stage as recited in claim 1 wherein the stator vane leading edge is reinforced between the first and second contact regions.

10. The gas turbine stage as recited in claim 1 wherein the rear face is an outer shroud rear face of an outer shroud of the rotor blade array.

11. The gas turbine stage as recited in claim 1 wherein an airfoil trailing edge of the rotor blade array facing the stator vane array is axially spaced apart from the stator vane array.

12. A gas turbine comprising at least one gas turbine stage as recited in claim 1.

13. An aircraft engine comprising the gas turbine as recited in claim 12.

* * * * *